(12) United States Patent
Katsuyama et al.

(10) Patent No.: US 10,196,057 B2
(45) Date of Patent: Feb. 5, 2019

(54) VEHICLE STABILITY CONTROL DEVICE (71) Applicants: TOYOTA JIDOSHA KABUSHIKI KAISHA, Toyota-shi, Aichi-ken (JP); KABUSHIKI KAISHA TOYOTA CHUO KENKYUSHO, Nagakute-shi, Aichi-ken (JP)

(72) Inventors: Etsuo Katsuyama, Hiratsuka (JP); Takao Kobayashi, Nagakute (JP)

(73) Assignees: TOYOTA JIDOSHA KABUSHIKI KAISHA, Toyota (JP); KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 0 days.

(21) Appl. No.: 15/815,139

(22) Filed: Nov. 16, 2017

(65) Prior Publication Data
US 2018/0170364 A1   Jun. 21, 2018

(30) Foreign Application Priority Data
Dec. 20, 2016   (JP) ................................. 2016-246530

(51) Int. Cl.
*B60W 30/045*   (2012.01)
*B60W 40/114*   (2012.01)
(Continued)

(52) U.S. Cl.
CPC ........... *B60W 30/045* (2013.01); *B60T 8/172* (2013.01); *B60T 8/17551* (2013.01); *B60T 8/246* (2013.01);
(Continued)

(58) Field of Classification Search
CPC ......... B60W 30/045; B60W 30/18109; B60W 40/114; B60W 2520/105; B60W 2520/125; B60T 8/172; B60T 8/17551; B60T 8/246
(Continued)

(56) References Cited

U.S. PATENT DOCUMENTS 6,076,033 A    6/2000  Hamada et al.
6,131,054 A   10/2000  Shibahata
(Continued)

FOREIGN PATENT DOCUMENTS

EP    2 484 572 A1    8/2012
JP    H09-086203 A    3/1997
(Continued)

*Primary Examiner* — Gertrude Arthur Jeanglaude
(74) *Attorney, Agent, or Firm* — Oliff PLC (57) ABSTRACT

A vehicle stability control device includes a yaw moment generation device and a control device. A variation yaw moment generated by simultaneous turn and acceleration/deceleration is expressed as a function of a longitudinal acceleration and a lateral acceleration. A longitudinal force and a lateral force of a tire have non-linear load dependency. The variation yaw moment when assuming that the load dependency is linear is a first variation yaw moment. The variation yaw moment considering the non-linear load dependency is a second variation yaw moment that is expressed as a product of the first variation yaw moment and a correction gain. In vehicle stability control, the control device controls the yaw moment generation device to generate a counter yaw moment counteracting the second variation yaw moment, based on the longitudinal acceleration, the lateral acceleration, and the correction gain.

7 Claims, 4 Drawing Sheets (51) Int. Cl.
  *B60W 30/18* (2012.01)
  *B60T 8/172* (2006.01)
  *B60T 8/1755* (2006.01)
  *B60T 8/24* (2006.01)

(52) U.S. Cl.
  CPC .... *B60W 30/18109* (2013.01); *B60W 40/114* (2013.01); *B60W 2520/105* (2013.01); *B60W 2520/125* (2013.01)

(58) Field of Classification Search
  USPC .......................................................... 701/72
  See application file for complete search history.

(56) References Cited

U.S. PATENT DOCUMENTS

| | | | | |
|---|---|---|---|---|
| 2005/0080545 | A1* | 4/2005 | Takagi | B60T 8/1755 701/70 |
| 2008/0071451 | A1* | 3/2008 | Yamaguchi | B60K 6/52 701/69 |
| 2015/0065293 | A1* | 3/2015 | Ando | B60L 11/14 477/1 |

FOREIGN PATENT DOCUMENTS

| | | |
|---|---|---|
| JP | H10-138783 A | 5/1998 |
| JP | H10-138784 A | 5/1998 |
| JP | 2006-117069 A | 5/2006 |
| JP | 2006-144858 A | 6/2006 |

\* cited by examiner

VEHICLE STABILITY CONTROL DEVICE

BACKGROUND

Technical Field

The present disclosure relates to vehicle stability control when a turn and acceleration or deceleration are performed simultaneously.

Background Art

When a vehicle performs acceleration or deceleration during a turn, load transfer occurs, a turning radius changes, and steering characteristics vary. For example, when a vehicle accelerates during a turn, understeer characteristics become stronger. To the contrary, when a vehicle decelerates during a turn, oversteer characteristics become stronger. To suppress such the variation in steering characteristics is important from a viewpoint of vehicle stabilization.

Patent Literature 1 and Patent Literature 2 disclose techniques of controlling a yaw moment of a vehicle for suppressing the variation in steering characteristics as mentioned above. More specifically, a variation yaw moment generated by acceleration or deceleration during a turn is estimated. Then, the vehicle is controlled such that a counter yaw moment for counteracting the variation yaw moment is generated. For example, the counter yaw moment can be generated by generating a braking force at a turning outer wheel or a turning inner wheel.

LIST OF RELATED ART

Patent Literature 1: Japanese Laid-Open Patent Publication No. H09-86203

Patent Literature 2: Japanese Laid-Open Patent Publication No. 2006-117069

SUMMARY

Each of a longitudinal force and a lateral force of a tire changes depending on a vertical load, namely, has load dependency. The load dependency is "non-linear". In other words, each of the longitudinal force and the lateral force of the tire changes non-linearly with respect to the vertical load. However, according to Patent Literature 1 and Patent Literature 2, the above-described variation yaw moment is estimated under assumption that the load dependency is "linear". In this case, estimation accuracy of the variation yaw moment is low. The low estimation accuracy of the variation yaw moment results in an inappropriate counter yaw moment, which is not preferable from a viewpoint of vehicle stabilization.

An object of the present disclosure is to provide a technique that can improve accuracy of vehicle stability control when acceleration or deceleration and a turn are performed simultaneously.

In an aspect of the present disclosure, a vehicle stability control device mounted on a vehicle is provided.

The vehicle stability control device includes:

a yaw moment generation device that generates a yaw moment; and a control device that uses the yaw moment generation device to perform vehicle stability control.

A variation yaw moment generated by acceleration or deceleration and a turn performed simultaneously is expressed as a function of a longitudinal acceleration and a lateral acceleration.

Each of a longitudinal force and a lateral force of a tire of the vehicle has non-linear load dependency.

The variation yaw moment when assuming that the load dependency is linear is a first variation yaw moment.

The variation yaw moment considering the non-linear load dependency is a second variation yaw moment that is expressed as a product of the first variation yaw moment and a correction gain.

In the vehicle stability control, the control device controls the yaw moment generation device to generate a counter yaw moment counteracting the second variation yaw moment, based on the longitudinal acceleration, the lateral acceleration, and the correction gain.

The variation yaw moment is generated due to acceleration or deceleration and a turn that are performed simultaneously. According to the present disclosure, the second variation yaw moment considering the non-linear load dependency and thus being highly accurate is used as the variation yaw moment. Therefore, accuracy of the counter yaw moment for counteracting the variation yaw moment also is increased. As a result, accuracy of the vehicle stability control is improved. This contributes to increase in confidence in the vehicle stability control.

EMBODIMENTS

Embodiments of the present disclosure will be described below with reference to the attached drawings.

1. Outline

In the present embodiment, we consider vehicle behavior at a time of "turn acceleration/deceleration". The "turn acceleration/deceleration" mean that a turn and acceleration or deceleration of a vehicle are performed simultaneously. Therefore, the turn acceleration/deceleration include both acceleration or deceleration being performed during a turn and a turn being performed during acceleration or deceleration. It can be said that the turn acceleration/deceleration is a state where both a longitudinal acceleration and a lateral acceleration occur.

Due to the turn acceleration/deceleration, load transfer occurs, a turning radius changes, and steering characteristics vary. For example, when the vehicle accelerates during a turn, understeer characteristics become stronger. To the contrary, when the vehicle decelerates during a turn, oversteer characteristics become stronger. To suppress such the variation in steering characteristics is important from a viewpoint of vehicle stabilization. According to the present embodiment, yaw moment control is performed in order to suppress the variation in steering characteristics caused by the turn acceleration/deceleration and thus to stabilize the vehicle.

More specifically, a yaw moment of the vehicle varies due to the turn acceleration/deceleration. Such the variation in yaw moment is hereinafter referred to as a "variation yaw moment $M_z$". A moment for counteracting the variation yaw moment $M_z$ caused by the turn acceleration/deceleration is hereinafter referred to as a "counter yaw moment $M_{zc}$". At the time of the turn acceleration/deceleration, if the variation yaw moment $M_z$ is estimated and the counter yaw moment $M_{zc}$ is generated, it is possible to suppress the variation in steering characteristics. To that end, it is important to accurately estimate the variation yaw moment $M_z$.

To calculate the variation yaw moment $M_z$, it is necessary to consider forces (i.e. a longitudinal force and a lateral force) generated at a tire at the time of the turn acceleration/deceleration. Here, each of the longitudinal force and the lateral force of the tire changes depending on a vertical load, namely, has load dependency. Furthermore, the load dependency is "non-linear". That is to say, each of the longitudinal force and the lateral force of the tire changes non-linearly with respect to the vertical load.

Figure 1:
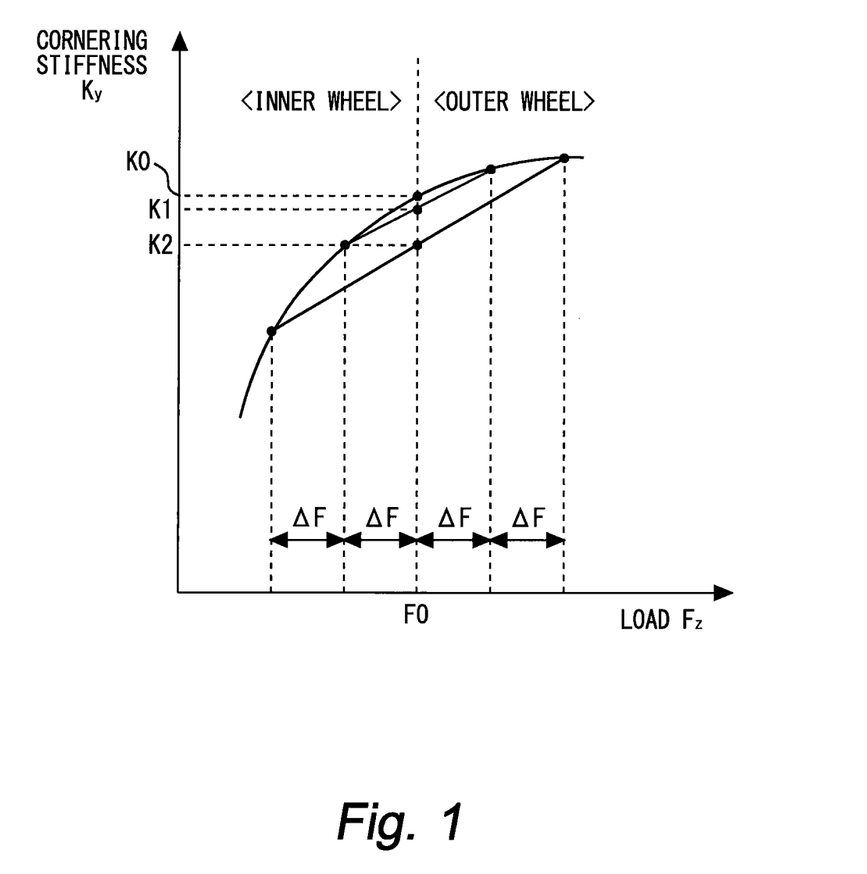
FIG. 1 is a diagram for explaining non-linear load dependency of a lateral force in an embodiment of the present disclosure.

As an example, the non-linear load dependency of the lateral force will be described with reference to FIG. 1. FIG. 1 is a graph showing a relationship between a cornering stiffness $K_y$ [N/deg] and the vertical load $F_z$ [N] of the tire. The cornering stiffness $K_y$ is a stiffness in a lateral direction, and is also called a cornering power. A product of the cornering stiffness $K_y$ and a slip angle corresponds to the lateral force.

The cornering stiffness $K_y$ changes depending on the vertical load $F_z$, and increases as the vertical load $F_z$ increases. If the load dependency is "linear", the cornering stiffness $K_y$ increases in proportion to the vertical load $F_z$. However, in reality, the load dependency is "non-linear" as shown in FIG. 1. That is, a rate of increase in the cornering stiffness $K_y$ with respect to increase in the vertical load $F_z$ becomes lower as the vertical load $F_z$ increases. In other words, a curve representing the relationship between the cornering stiffness $K_y$ and the vertical load $F_z$ is convex upward as shown in FIG. 1. This is the non-linearity.

The non-linearity affects an average cornering stiffness during a turn. Here, the average cornering stiffness is an average value of the cornering stiffnesses $K_y$ of left and right tires. First, let us consider a case where the vehicle is not making a turn and the vertical load $F_z$ of each of the left and right tires is F0. In this case, the cornering stiffness $K_y$ of each of the left and right tires is K0, and the average cornering stiffness also is K0.

Next, let us consider a case where the vehicle is making a turn and thus load transfer occurs and a difference in the vertical load $F_z$ occurs between the left tire and the right tire. For example, the vertical load $F_z$ on an outer wheel side becomes F0+ΔF and the vertical load $F_z$ on an inner wheel side becomes F0−ΔF. In this case, as can be seen from FIG. 1, the average cornering stiffness becomes K1 lower than K0. This results from the fact that the curve representing the relationship between the cornering stiffness $K_y$ and the vertical load $F_z$ is convex upward. When the load transfer amount increases further, the vertical load $F_z$ on the outer wheel side becomes F0+2 ΔF and the vertical load $F_z$ on the inner wheel side becomes F0−2ΔF. In this case, the average cornering stiffness becomes K2 even lower than K1.

As described above, when the load dependency is non-linear, the average cornering stiffness becomes lower as the load transfer amount becomes larger. However, according to Patent Literature 1 and Patent Literature 2 mentioned above, the load dependency is "linear". When the load dependency is linear, the average cornering power remains constant regardless of the load transfer amount. Therefore, there is a large difference in a calculation result of the lateral force and thus the variation yaw moment $M_z$ between the case of the non-linear load dependency and the case of the linear load dependency. When the load dependency is linear, an estimation error of the variation yaw moment $M_z$ is large and estimation accuracy is low. This is not preferable in terms of the vehicle stabilization.

According to the present embodiment, when the variation yaw moment $M_z$ is calculated, the "non-linearity" of the load dependency of the lateral force is taken into consideration. Similarly, non-linearity of load dependency of the longitudinal force of the tire also is taken into consideration. A parameter corresponding to the longitudinal force is a driving stiffness $K_x$ (a stiffness in a longitudinal direction). In order to take the non-linearity into consideration, the driving stiffness $K_x$ and the cornering stiffness $K_y$ according to the present embodiment are defined by the following Equation (1) and Equation (2), respectively.

[Equation 1]

$$K_x = [1 - e(F_z - F_{z0})] c_x F_z \quad (1)$$

[Equation 2]

$$K_y = [1 - e(F_z - F_{z0})] c_y F_z \quad (2)$$

Here, $c_x$ is a normalized driving stiffness, and $c_y$ is a normalized cornering stiffness. $F_{z0}$ is a rated load, and $e$ is a non-linearity coefficient being a positive value (e>0). The non-linearity coefficient e being a positive value means that the curve representing the relationship between the stiffness and the vertical load $F_z$ is convex upward as shown in FIG. 1. Note that e=0 means linearity. When the driving stiffness $K_x$ and the cornering stiffness $K_y$ above are used, the variation yaw moment $M_z$ caused by the turn acceleration/deceleration is expressed by the following Equation (3) or Equation (4). Derivation of Equation (3) and Equation (4) will be described at the end of this description.

[Equation 3]

$$M_z = -mgh \frac{A_x}{g} \frac{A_y}{g} \frac{1 + eF_{z0} + e\left\{\frac{l_f(F_{z1}^2 + F_{z2}^2) - l_r(F_{z3}^2 + F_{z4}^2)}{mA_x h}\right\}}{1 + eF_{z0} - e\frac{\sum F_{zj}^2}{mg}} \quad (3)$$

[Equation 4]

$$M_z = -mgh \frac{A_x}{g} \frac{A_y}{g} \frac{1 + e\left(F_{z0} - \frac{mg}{2}\right)}{1 + e\left\{F_{z0} - \frac{4}{mg}\left[\left(\frac{mg}{4}\right)^2 + \left(\frac{mA_x h}{2l}\right)^2 + \left(\frac{mA_y h}{2t}\right)^2\right]\right\}} \quad (4)$$

Here, m is a vehicle mass, g is a gravitational acceleration, h is a center of gravity height of the vehicle, l is a wheelbase, $l_f$ is a distance from the center of gravity to a front axle, $l_r$ is a distance from the center of gravity to a rear axle, and t is a track (tread). $A_x$ is a longitudinal acceleration, and $A_y$ is a lateral acceleration. $F_{zj}$ (j=1 to 4) is the vertical load of each tire, and the suffix j represents the tire position. More specifically, j=1, 2, 3, and 4 represent left front, right front, left rear, and right rear, respectively.

The vertical load $F_{zj}$ at the time of the turn acceleration/deceleration is calculated from the vehicle mass m, longitudinal weight distribution, and a load transfer amount. The load transfer amount is calculated based on the vehicle mass m, the center of gravity height h, the wheelbase l, the track t, roll stiffness distribution, the longitudinal acceleration $A_x$, and the lateral acceleration $A_y$. Therefore, when Equation (3)

is used, it is possible to calculate the variation yaw moment $M_z$ based on various parameters of the vehicle, the longitudinal acceleration $A_x$, and the lateral acceleration $A_y$. Under a certain condition, Equation (3) is simplified to Equation (4). Similarly, when Equation (4) is used, it is possible to calculate the variation yaw moment $M_z$ based on various parameters of the vehicle, the longitudinal acceleration $A_x$, and the lateral acceleration $A_y$. In either case, the variation yaw moment $M_z$ is expressed as a function of the longitudinal acceleration $A_x$ and the lateral acceleration $A_y$.

It should be noted that when the non-linearity of the load dependency is neglected, namely, when the non-linearity coefficient e is 0, the variation yaw moment $M_z$ is expressed by the following Equation (5).

[Equation 5]

$$M_z = -mgh \frac{A_x}{g} \frac{A_y}{g} \quad (5)$$

The variation yaw moment $M_z$ expressed by Equation (5) is hereinafter referred to as a "first variation yaw moment". The first variation yaw moment is the variation yaw moment $M_z$ when assuming that the load dependency is linear, namely, when neglecting the non-linearity. The first variation yaw moment is described in Patent Literature 1 and Patent Literature 2 mentioned above. On the other hand, the variation yaw moment $M_z$ expressed by Equation (3) and Equation (4) is hereinafter referred to as a "second variation yaw moment". The second variation yaw moment is the variation yaw moment $M_z$ considering the non-linear load dependency and thus being highly accurate. The second variation yaw moment is expressed as a product of the first variation yaw moment and a correction gain GainE, as in the following Equation (6).

[Equation 6]

$$M_z = -mgh \frac{A_x}{g} \frac{A_y}{g} \times GainE \quad (6)$$

The correction gain GainE is given by the following Equation (7) or Equation (8).

[Equation 7]

$$GainE = \frac{1 + eF_{z0} + e\left\{\frac{l_f(F_{z1}^2 + F_{z2}^2) - l_r(F_{z3}^2 + F_{z4}^2)}{mA_x h}\right\}}{1 + eF_{z0} - e\frac{\sum F_{zj}^2}{mg}} \quad (7)$$

[Equation 8]

$$GainE = \frac{1 + e\left(F_{z0} - \frac{mg}{2}\right)}{1 + e\left\{F_{z0} - \frac{4}{mg}\left[\left(\frac{mg}{4}\right)^2 + \left(\frac{mA_x h}{2l}\right)^2 + \left(\frac{mA_y h}{2t}\right)^2\right]\right\}} \quad (8)$$

In the case of e=0 where the non-linearity is neglected, the correction gain GainE is 1. According to the present embodiment, the non-linearity coefficient e is positive (e>0). In this case, the correction gain GainE is less than 1 (i.e. GainE<1).

Figure 2:
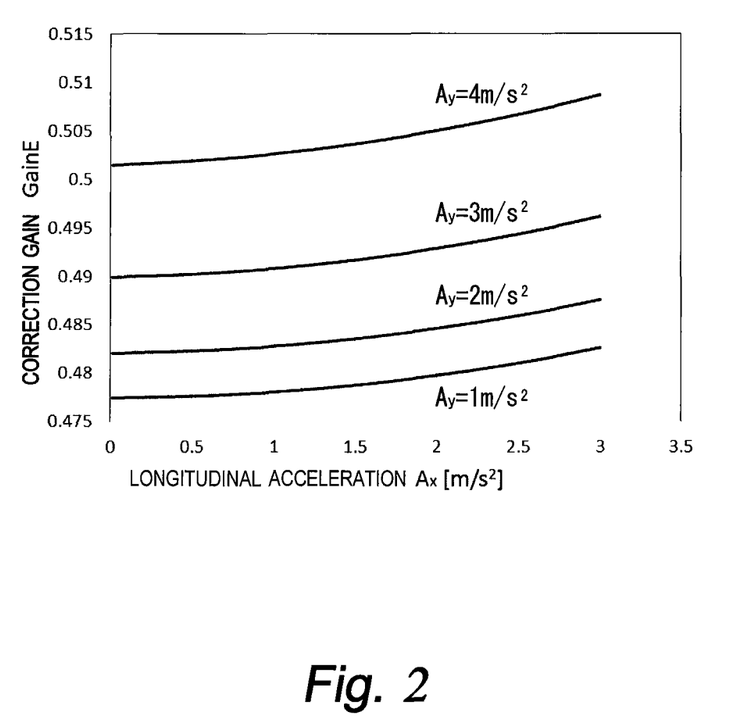
FIG. 2 is a graph showing a calculation example of a correction gain in an embodiment of the present disclosure.

FIG. 2 is a graph showing a calculation example of the correction gain GainE when Equation (7) is used. In the present calculation example, the following values are used as the parameters of the vehicle.

vehicle mass m=1800 kg
weight distribution=50:50
wheelbase l=2.6 m
track t=1.6 m
center of gravity height h=0.6 m
roll stiffness distribution=60:40
normalized driving stiffness $c_x$=30
normalized cornering stiffness $c_y$=25
rated load $F_{z0}$=4500 N
non-linearity coefficient e=0.00012

As can be seen from FIG. 2, the correction gain GainE is less than 1. The correction gain GainE becomes larger as the longitudinal acceleration $A_x$ increases. Moreover, the correction gain GainE becomes larger as the lateral acceleration $A_y$ increases.

According to the present embodiment, the highly accurate second variation yaw moment expressed by the above Equation (6) is adopted as the variation yaw moment $M_z$ caused by the turn acceleration/deceleration. That is, the counter yaw moment $M_{zc}$ for counteracting the second variation yaw moment is calculated at the time of the turn acceleration/deceleration. The counter yaw moment $M_{zc}$ is given by the following Equation (9).

[Equation 9]

$$M_{zc} = -M_z = mgh \frac{A_x}{g} \frac{A_y}{g} \times GainE \quad (9)$$

As can be seen from Equation (9), the counter yaw moment $M_{zc}$ can be calculated based on the longitudinal acceleration $A_x$, the lateral acceleration $A_y$, and the correction gain GainE. Then, actuators of the vehicle are controlled to generate the calculated counter yaw moment $M_{zc}$. By applying such the counter yaw moment $M_{zc}$, the variation yaw moment $M_z$ is canceled out. As a result, the variation in steering characteristics caused by the turn acceleration/deceleration is suppressed and thus the vehicle is stabilized. According to the present embodiment, accuracy of vehicle stability control is improved, because the highly accurate second variation yaw moment is adopted as the variation yaw moment $M_z$.

As a comparative example, let us consider a case where the non-linearity of the load dependency is neglected. In the case of the comparative example, the variation yaw moment $M_z$ is the first variation yaw moment given by the above Equation (5). That is, the comparative example corresponds to a case where the correction gain GainE is 1. In the case of the comparative example (i.e. GainE=1), the counter yaw moment $M_{zc}$ is calculated to be larger than the case where the non-linearity is taken into consideration (i.e. GainE<1), as can be seen from Equation (9). As a result, an excessive counter yaw moment $M_{zc}$ is applied to the vehicle during the vehicle stability control, which is not preferable in terms of the vehicle stabilization.

For example, when the vehicle accelerates during a turn, the understeer characteristics become stronger. In order to suppress the understeer characteristics, the counter yaw moment $M_{zc}$ is applied to the vehicle by the vehicle stability control. However, if the counter yaw moment $M_{zc}$ is excessive, not only the understeer characteristics are suppressed but also the steering characteristics may be adversely changed to oversteer characteristics, which inhibits the vehicle stabilization. Thus, a driver of the vehicle feels a sense of strangeness against such the vehicle stability control.

As described above, when the non-linearity of the load dependency is neglected, accuracy of the vehicle stability control is deteriorated, and the driver feels a sense of strangeness against the vehicle stability control. On the other hand, according to the present embodiment, the non-linearity of the load dependency is taken into consideration. Accordingly, the accuracy of the vehicle stability control is improved. This contributes to increase in confidence in the vehicle stability control.

Moreover, according to the present embodiment, the variation yaw moment $M_z$ is canceled out and thus change in the turning radius is suppressed. This means that a travel direction of the vehicle is not disturbed even when the turn acceleration/deceleration is performed. Therefore, vehicle maneuverability is improved.

Furthermore, when the present embodiment is applied to an autonomous driving vehicle, followability to a target path is improved.

Hereinafter, a configuration example for achieving the vehicle stability control according to the present embodiment will be described.

2. Configuration Example

Figure 3:
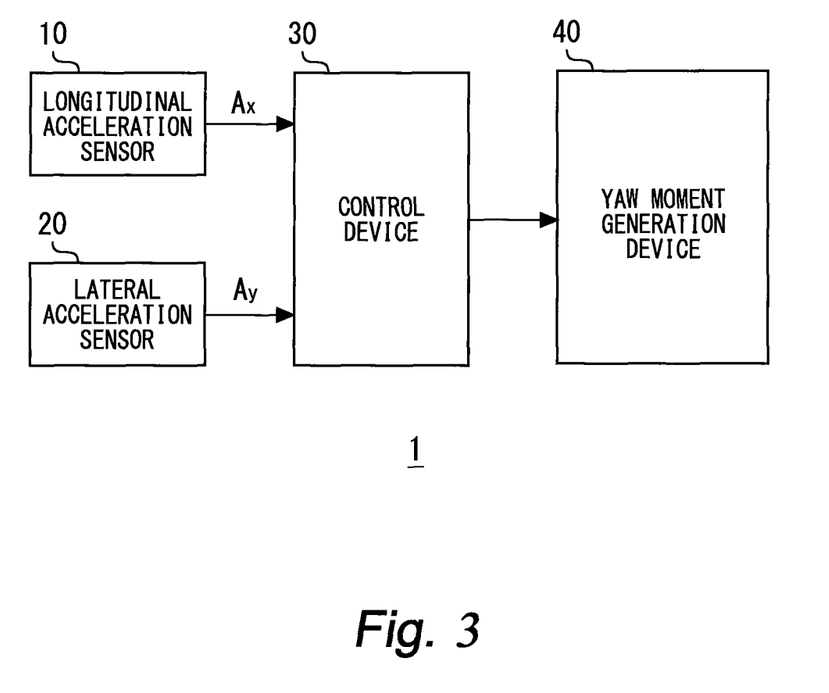
FIG. 3 is a block diagram showing a configuration example of a vehicle stability control device according to an embodiment of the present disclosure.

FIG. 3 is a block diagram showing a configuration example of the vehicle stability control device 1 according to the present embodiment. The vehicle stability control device 1 is mounted on the vehicle and performs the vehicle stability control. More specifically, the vehicle stability control device 1 is provided with a longitudinal acceleration sensor 10, a lateral acceleration sensor 20, a control device 30, and a yaw moment generation device 40.

The longitudinal acceleration sensor 10 detects the longitudinal acceleration $A_x$ of the vehicle and sends the detected information to the control device 30. The lateral acceleration sensor 20 detects the lateral acceleration $A_y$ of the vehicle and sends the detected information to the control device 30.

The control device 30 performs the vehicle stability control. Typically, the control device 30 is a microcomputer including a processor, a memory, and an input/output interface. The control device 30 is also called an ECU (Electronic Control Unit). The control device 30 receives a variety of information through the input/output interface. The variety of information includes the detected information sent from the longitudinal acceleration sensor 10 and the lateral acceleration sensor 20. The control device 30 uses the yaw moment generation device 40 to perform the vehicle stability control based on the received information.

The yaw moment generation device 40 is a mechanism that generates a yaw moment of the vehicle. More specifically, the yaw moment generation device 40 includes at least any of a driving device, a braking device, and a turning device. The yaw moment generation device 40 may be a combination of some of the driving device, the braking device, and the turning device.

The driving device is configured to be able to individually control respective driving forces of left and right driving wheels. For example, the driving device includes in-wheel motors arranged near the driving wheels. By using the driving device to appropriately control a difference in driving force between left and right driving wheels, the control device 30 can generate a desired counter yaw moment $M_{zc}$.

The braking device is configured to be able to individually control respective braking forces of wheels. Typically, the braking device includes a brake actuator that is capable of individually controlling respective pressures of brake fluids supplied to wheel cylinders of the wheels. By using the braking device to appropriately control a difference in braking force between the left side and the right side of the vehicle, the control device 30 can generate a desired counter yaw moment $M_{zc}$.

The turning device directly turns the wheel. For example, the turning device includes an electric power steering (EPS) device. By using the turning device to appropriately control a steering angle of the wheel, the control device 30 can generate a desired counter yaw moment $M_{zc}$.

Figure 4:
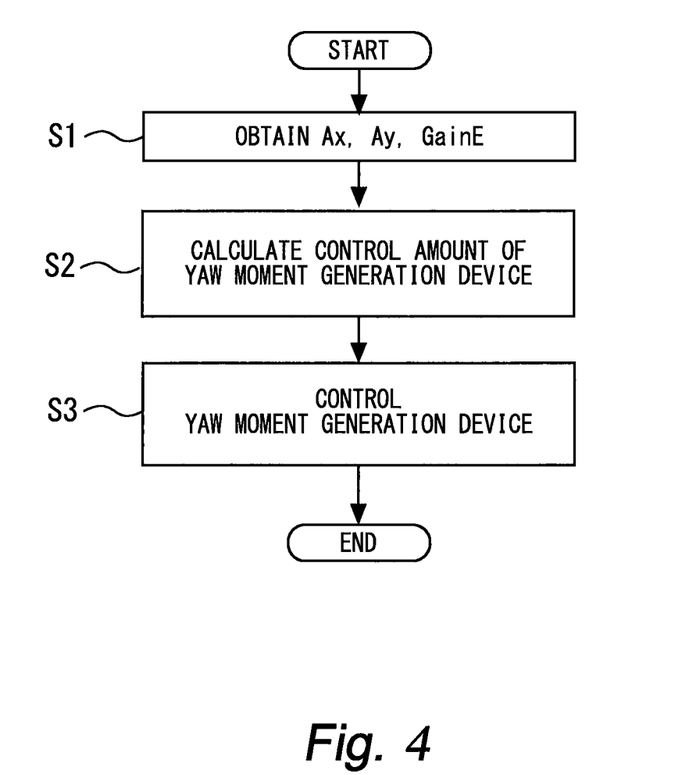
FIG. 4 is a flow chart showing vehicle stability control according to an embodiment of the present disclosure.

FIG. 4 is a flow chart showing the vehicle stability control by the control device 30 according to the present embodiment.

Step S1:

The control device 30 receives the detected information of the longitudinal acceleration $A_x$ from the longitudinal acceleration sensor 10. In addition, the control device 30 receives the detected information of the lateral acceleration $A_y$ from the lateral acceleration sensor 20. When none of the longitudinal acceleration $A_x$ and the lateral acceleration $A_y$ is zero, it means the turn acceleration/deceleration. In this case, the second variation yaw moment expressed by the above Equation (6) is expected to be generated. In order to estimate the second variation yaw moment, the control device 30 obtains the correction gain GainE. Various examples are considered as the correction gain GainE, as follows.

First Example

In a first example, the correction gain GainE is a constant. As shown in FIG. 2, the correction gain GainE varies depending on the longitudinal acceleration $A_x$ and the lateral acceleration $A_y$. However, a variation range is not so large. In the example shown in FIG. 2, the correction gain GainE merely varies within a range centering on about 0.49 and having a width of about 0.03. Rather, a difference between the case where the non-linearity is neglected (i.e. GainE=1) and the case where the non-linearity is considered (GainE=about 0.49) is much greater. Therefore, even when the correction gain GainE is set to a constant (for example, 0.49), the accuracy is improved remarkably as compared with the case where the non-linearity is neglected. In other words, it is possible to obtain the effects of the present embodiment by setting the correction gain GainE to a constant less than 1.

When the correction gain GainE is a constant, the following effect can be further obtained. That is, at a subsequent Step S2 where the counter yaw moment $M_{zc}$ and a control amount of the yaw moment generation device 40 are calculated, a computation load imposed on the control device 30 is reduced and a computation time also is reduced. Reduction in the computation load and the computation time means improvement of response performance of the vehicle stability control by the control device 30, which is preferable.

The correction gain GainE being a constant is beforehand recorded in the memory of the control device 30. The control device 30 can obtain the correction gain GainE just by reading the correction gain GainE from the memory.

Second Example

In a second example, the correction gain GainE is given by an approximate equation expressed by the following Equation (10).

[Equation 10]

$$\mathrm{Gain}E = aA_x^2 + bA_y^2 + c \quad (10)$$

Coefficients a, b and a constant c are determined in advance, for example, by fitting processing using the calculation result shown in FIG. 2. Then, Equation (10) is beforehand recorded in the memory of the control device 30. The control device 30 can calculate the correction gain GainE by using the longitudinal acceleration $A_x$, the lateral acceleration $A_y$, and Equation (10). It can be said that the second example is superior in terms of a good balance between improvement of accuracy and reduction in the computation load.

Third Example

In a third example, the correction gain GainE is given by the above Equation (7) or Equation (8). Equation (7) or Equation (8) is beforehand recorded in the memory of the control device 30. The control device 30 can calculate the correction gain GainE by using the longitudinal acceleration $A_x$, the lateral acceleration $A_y$, and Equation (7) or Equation (8). The third example is most excellent in terms of accuracy.

Fourth Example

In a fourth example, the correction gain GainE is calculated based on a correction gain map. The correction gain map is a map indicating a correspondence relationship between an input parameter and the correction gain GainE. The input parameter at least includes the longitudinal acceleration $A_x$ and the lateral acceleration $A_y$. Such the correction gain map is created in advance, for example, by fitting processing using the calculation result shown in FIG. 2. Then, the correction gain map is beforehand recorded in the memory of the control device 30. The control device 30 can calculate the correction gain GainE by using the input parameter ($A_x$, $A_y$) and the correction gain map. It can be said that the fourth example is superior in terms of a good balance between improvement of accuracy and reduction in the computation load.

In the second to fourth examples described above, the correction gain GainE is expressed as a function of the longitudinal acceleration $A_x$ and the lateral acceleration $A_y$. The function has characteristics as shown in FIG. 2. That is, the correction gain GainE becomes larger as the longitudinal acceleration $A_x$ increases. Moreover, the correction gain GainE becomes larger as the lateral acceleration $A_y$ increases. The control device 30 can calculate the correction gain GainE by using the longitudinal acceleration $A_x$, the lateral acceleration $A_y$, and the function.

Step S2:

The control device 30 calculates the counter yaw moment $M_{zc}$ by using the above Equation (9). Equation (9) is beforehand recorded in the memory of the control device 30. By using the longitudinal acceleration $A_x$, the lateral acceleration $A_y$, the correction gain GainE, and Equation (9), the control device 30 can calculate the counter yaw moment $M_{zc}$ counteracting the second variation yaw moment.

Furthermore, the control device 30 calculates a control amount of the yaw moment generation device 40 required for generating the counter yaw moment $M_{zc}$. For example, the control amount is calculated based on a control amount map. The control amount map is a map indicating a correspondence relationship between an input parameter and the control amount of the yaw moment generation device 40. The input parameter at least includes the counter yaw moment $M_{zc}$. Such the control amount map is created in advance based on characteristics of the yaw moment generation device 40. Then, the control amount map is beforehand recorded in the memory of the control device 30. By using the input parameter ($M_{zc}$) and the control amount map, the control device 30 can calculate the control amount of the yaw moment generation device 40 required for generating the counter yaw moment $M_{zc}$.

Step S3:

The control device 30 controls the yaw moment generation device 40 with the control amount determined at Step S2. As a result, the yaw moment generation device 40 operates to generate the counter yaw moment $M_{zc}$ counteracting the second variation yaw moment. Consequently, the variation in steering characteristics caused by the turn acceleration/deceleration is suppressed and thus the vehicle is stabilized. According to the present embodiment, the accuracy of the vehicle stability control is improved, because the highly accurate second variation yaw moment and counter yaw moment $M_{zc}$ are used.

3. Derivation of Equation (3) and Equation (4)

Hereinafter, derivation of the above Equation (3) and Equation (4) will be described briefly.

The driving stiffness $K_{xj}$ and the cornering stiffness $K_{yj}$ considering the non-linearity of the load dependency are defined by the following Equation (11) and Equation (12), respectively. Here, the suffix j represents the tire position. More specifically, j=1, 2, 3, and 4 represent left front, right front, left rear, and right rear, respectively.

[Equation 11]

$$K_{xj}=[1-e(F_{zj}-F_{z0})]c_x F_{zj} \quad (11)$$

[Equation 12]

$$K_{yj}=[1-e(F_{zj}-F_{z0})]c_y F_{zj} \quad (12)$$

Here, $c_x$ is the normalized driving stiffness, and $c_y$ is the normalized cornering stiffness. $F_{z0}$ is the rated load, $F_{zj}$ is the vertical load of each tire, and e is the non-linearity coefficient.

The lateral force $F_{yj}$ of each tire is expressed by the following Equation (13). Here, $\alpha_j$ is a slip angle.

[Equation 13]

$$F_{yj}=-K_{yj}\alpha_j \quad (13)$$

Let us consider yaw moment control for suppressing the variation in steering characteristics due to acceleration/deceleration. For that purpose, a yaw moment for equalizing respective slip angles of four wheels varied due to the acceleration/deceleration is calculated. That is, a situation expressed by the following Equation (14) is considered.

[Equation 14]

$$\alpha_1=\alpha_2=\alpha_3=\alpha_4=\alpha^* \quad (14)$$

In this case, the yaw moment $M_z$ generated by the lateral force $F_{yj}$ is expressed by the following Equation (15). Here, $l_f$ is a distance from the center of gravity to a front axle, and $l_r$ is a distance from the center of gravity to a rear axle.

[Equation 15]

$$\begin{aligned}M_z &= l_f(F_{y1} + F_{y2}) - l_r(F_{y3} + F_{y4}) \\ &= l_f(-K_{y1}\alpha_1 - K_{y2}\alpha_2) - l_r(-K_{y3}\alpha_3 - K_{y4}\alpha_4) \\ &= -\alpha^*[l_f(K_{y1} + K_{y2}) - l_r(K_{y3} + K_{y4})]\end{aligned} \quad (15)$$

Furthermore, the following Equations (16) to (18) are satisfied.

[Equation 16]

$$K_{y1} + K_{y2} = c_y \left[ (1 + eF_{z0})\left(F_{zf} - \frac{mA_x h}{2}\right) - e(F_{z1}^2 + F_{z2}^2) \right] \quad (16)$$

[Equation 17]

$$K_{y3} + K_{y4} = c_y \left[ (1 + eF_{z0})\left(F_{zr} - \frac{mA_x h}{2}\right) - e(F_{z3}^2 + F_{z4}^2) \right] \quad (17)$$

[Equation 18]

$$\alpha^* = -\frac{F_y}{\sum K_{yj}} = -\frac{mA_y}{c_y mg\left[(1 + eF_{z0}) - \frac{e}{mg}\sum F_{zj}^2\right]} \quad (18)$$

Here, m is the vehicle mass, g is the gravitational acceleration, h is the center of gravity height of the vehicle. $F_{zf}$ is a front axle load when the vehicle is stationary, and $F_{zr}$ is a rear axle load when the vehicle is stationary. $A_x$ is the longitudinal acceleration, and $A_y$ is the lateral acceleration. Substituting these Equations (16) to (18) into Equation (15) yields the following Equation (19).

[Equation 19]

$$M_z = -\alpha^* [l_f(K_{y1} + K_{y2}) - l_r(K_{y3} + K_{y4})]$$

$$= -mgh \frac{A_x}{g} \frac{A_y}{g} \frac{1 + eF_{z0} + e\left\{\frac{l_f(F_{z1}^2 + F_{z2}^2) - l_r(F_{z3}^2 + F_{z4}^2)}{mA_x h}\right\}}{1 + eF_{z0} - e\frac{\sum F_{zj}^2}{mg}} \quad (19)$$

This Equation (19) corresponds to the above-mentioned Equation (3). The vertical load $F_{zj}$ is calculated from the vehicle mass m, the longitudinal weight distribution, and the load transfer amount. The load transfer amount is calculated based on the vehicle mass m, the center of gravity height h, the wheelbase l, the track t, the roll stiffness distribution, the longitudinal acceleration $A_x$, and the lateral acceleration $A_y$. Under a condition that the roll stiffness distribution is 50:50, the longitudinal weight distribution is 50:50, and the front track t and the rear track t are equal to each other, Equation (19) is simplified to the following Equation (20). This Equation (20) corresponds to the above-mentioned Equation (4).

[Equation 20]

$$M_z = -mgh\frac{A_x}{g}\frac{A_y}{g} \frac{1 + e\left(F_{z0} - \frac{mg}{2}\right)}{1 + e\left\{F_{z0} - \frac{4}{mg}\left[\left(\frac{mg}{4}\right)^2 + \left(\frac{mA_x h}{2l}\right)^2 + \left(\frac{mA_y h}{2t}\right)^2\right]\right\}} \quad (20)$$

What is claimed is:

1. A vehicle stability control device mounted on a vehicle, comprising:

a yaw moment generation device that generates a yaw moment; and a control device that uses the yaw moment generation device to perform vehicle stability control, wherein a variation yaw moment generated by acceleration or deceleration and a turn performed simultaneously is expressed as a function of a longitudinal acceleration and a lateral acceleration, each of a longitudinal force and a lateral force of a tire of the vehicle has non-linear load dependency, the variation yaw moment when assuming that the load dependency is linear is a first variation yaw moment, and the variation yaw moment considering the non-linear load dependency is a second variation yaw moment that is expressed as a product of the first variation yaw moment and a correction gain, and wherein in the vehicle stability control, the control device controls the yaw moment generation device to generate a counter yaw moment counteracting the second variation yaw moment, based on the longitudinal acceleration, the lateral acceleration, and the correction gain.

2. The vehicle stability control device according to claim 1, wherein the correction gain is less than 1.

3. The vehicle stability control device according to claim 1, wherein the correction gain is a constant less than 1.

4. The vehicle stability control device according to claim 1, wherein the correction gain is expressed as a function of the longitudinal acceleration and the lateral acceleration, and the control device calculates the correction gain by using the longitudinal acceleration and the lateral acceleration.

5. The vehicle stability control device according to claim 4, wherein the correction gain becomes larger as the longitudinal acceleration increases, and the correction gain becomes larger as the lateral acceleration increases.

6. The vehicle stability control device according to claim 4, wherein the correction gain is expressed by the following equation:

$$GainE = \frac{1 + e\left(F_{z0} - \frac{mg}{2}\right)}{1 + e\left\{F_{z0} - \frac{4}{mg}\left[\left(\frac{mg}{4}\right)^2 + \left(\frac{mA_x h}{2l}\right)^2 + \left(\frac{mA_y h}{2t}\right)^2\right]\right\}},$$

wherein g is a gravitational acceleration,
m is a mass of the vehicle,
h is a center of gravity height of the vehicle,
l is a wheelbase of the vehicle,
t is a track of the vehicle,
e is a non-linearity coefficient being a positive value,
$F_{z0}$ is a rated load,
$A_x$ is the longitudinal acceleration, and
$A_y$ is the lateral acceleration.

7. The vehicle stability control device according to claim 1, wherein the first variation yaw moment is expressed by the following equation:

$$M_z = -mgh\frac{A_x}{g}\frac{A_y}{g},$$

wherein g is a gravitational acceleration,
m is a mass of the vehicle,
h is a center of gravity height of the vehicle,
$A_x$ is the longitudinal acceleration, and
$A_y$ is the lateral acceleration.

* * * * *